United States Patent [19]

Seto

[11] 3,919,368
[45] Nov. 11, 1975

[54] SIMPLIFIED PROCESS AND APPARATUS FOR THE PRODUCTION OF CUPS FROM A FOAMED THERMOPLASTIC SHEET

[76] Inventor: Jingo Seto, 29-6, Akatsuka Shinmachi 3-chome, Itabashi-ku, Tokyo, Japan

[22] Filed: Jan. 5, 1973

[21] Appl. No.: 321,214

[30] Foreign Application Priority Data
Jan. 14, 1972  Japan................................ 47-6348

[52] U.S. Cl.................... 264/45; 264/51; 264/53; 264/249; 264/321
[51] Int. Cl.............................................. B29d 27/00
[58] Field of Search................ 264/51, 53, 321, 249

[56] References Cited
UNITED STATES PATENTS

| | | | |
|---|---|---|---|
| 2,951,260 | 9/1960 | Harrison et al. | 264/53 |
| 3,069,725 | 12/1962 | Root | 264/51 |
| 3,248,461 | 4/1966 | Wiles et al. | 264/51 |
| 3,338,997 | 8/1967 | Tigner | 264/51 |
| 3,344,222 | 9/1967 | Shapiro et al. | 264/321 |
| 3,658,615 | 4/1972 | Amberg | 264/321 |
| 3,673,033 | 6/1972 | MacDaniel et al. | 264/321 |
| 3,712,844 | 1/1973 | Ratten et al. | 264/51 |

*Primary Examiner*—Eugene C. Rzucidlo
*Attorney, Agent, or Firm*—Frank J. Jordan

[57] ABSTRACT

A simplified process and apparatus for producing a foamed plastic-made disposable container having an improved surface and upper and lower rigid rims from a foamed plastic-made side wall blank for the container, the wall blank being curled with end portions overlapped each other, and a plastic or non-plastic bottom blank for the container by locally heating only the overlapped end portions of the wall blank and the upper and lower end portions thereof to melt bond the overlapped end portions together and highly expand the upper and lower portions followed by compressing the expanded portions to form upper and lower rigid rim, thereby producing the desired container.

5 Claims, 10 Drawing Figures

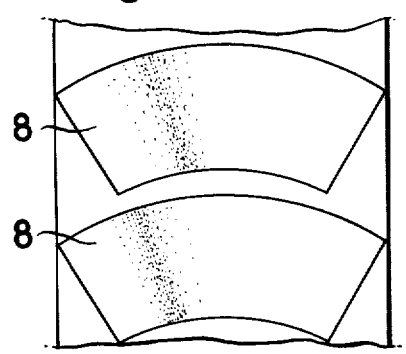
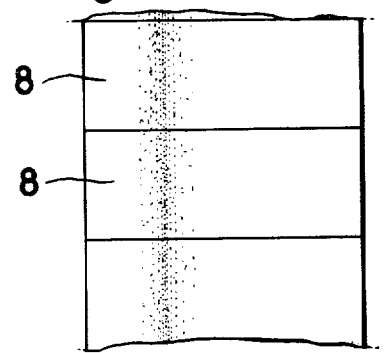
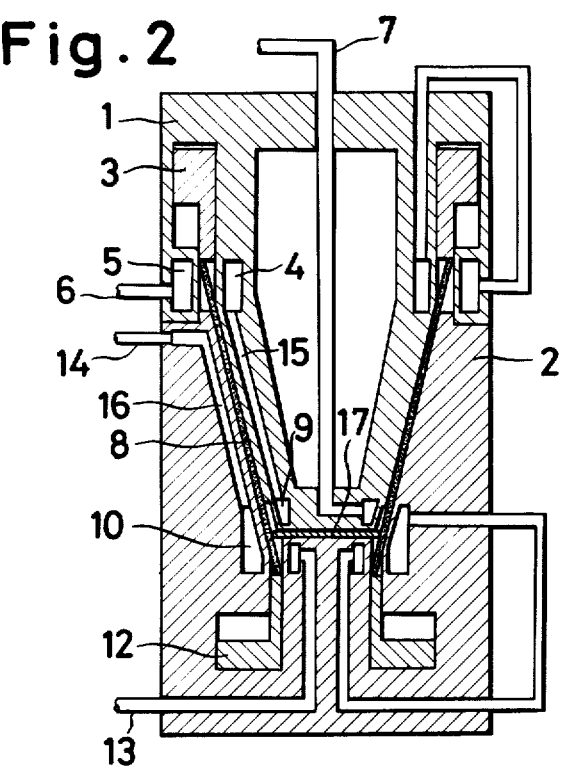

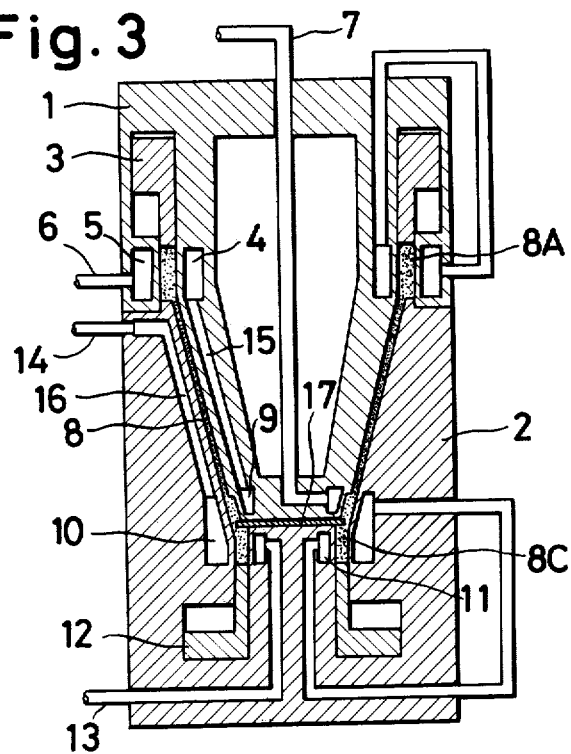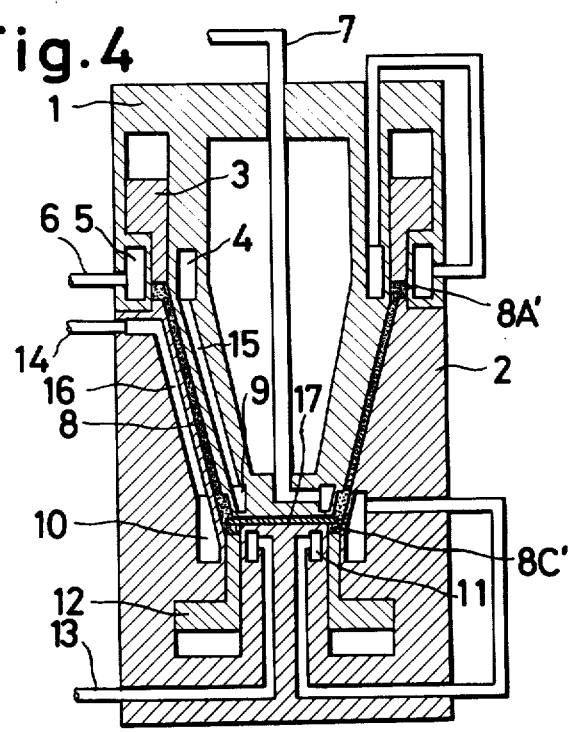

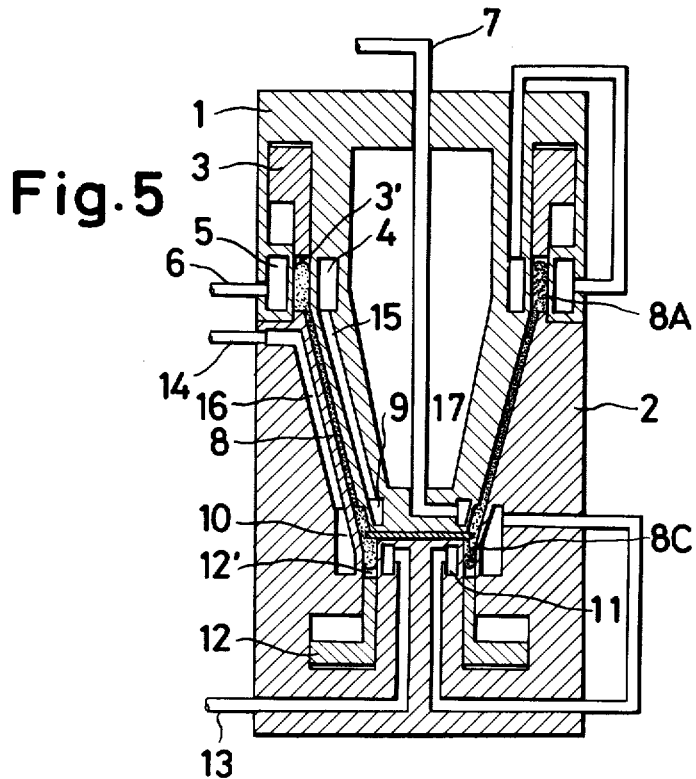
Fig. 5
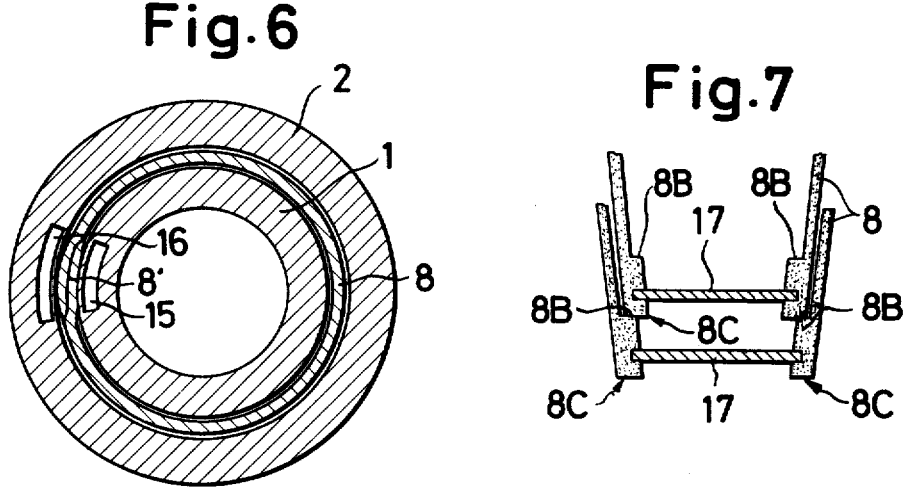
Fig. 6
Fig. 7

SIMPLIFIED PROCESS AND APPARATUS FOR THE PRODUCTION OF CUPS FROM A FOAMED THERMOPLASTIC SHEET

This invention relates to a simplified process and apparatus for producing disposable, foamed plastic-made containers and more particularly to a simplified process and apparatus for producing disposable cups having an excellent surface appearance and high grasping strength from a side wall blank cut out of an expansible thermoplastic foamed sheet such as a foamed polystyrene sheet, and a bottom blank cut out of a plastic or non-plastic sheet, by heating only the portions of the blanks necessary to melt bond together in order to form the blanks into the container with an overlapped wall seam.

It is known that if, for example, a wall blank cut out of such foamed thermoplastic sheet is heated with its end portions overlapped each other in a pair of suitable dies, the air or other gas present in the bubbles or pores as well as the blowing (or foaming) agent contained in the sheet will expand or foam to generate a self-compressing force thereby melt bonding the overlapped portions to each other while they are in the plastic state. In the known process such wall blank with its end portions overlapped each other is positioned in the space between male and female dies and then wholly heated to melt bond the overlapped end portions to each other to form a wall for a container. However, such known processes are very inconvenient from the view-point of practical use and have many disadvantages as follows:

1. The wall blank for a container needs, in most cases, to be printed prior to heating in the dies. When the blank with a print thereon is wholly heated, the print will also be heated whereby it chaps, peels from the blank, discolors and causes other undesirable changes.

2. The print will be deformed due to its thermal expansion.

3. It is difficult to determine how thick the wall blank should be with respect to the clearance between the male and female dies to obtain a satisfactory, thermally shaped cup. If the blank is too thick with respect to the clearance between the dies, it will have to be undesirably jammed into the clearance (especially when the wall blank is used for a cylindrical cup) for thermal molding; while, if the blank is too thin, it will necessarily be shrunk when heated, foamed and cooled, this foaming being inevitably accompanied with shrinkage of the blank in the surface direction whereby a satisfactory cup cannot be obtained.

4. If the blank is made of foamed polystyrene sheet material which is especially frequently be used, and it is heated and cooled, the thus-molded product will cling to the male die due to its remarkable shrinkage and thus it will not be released from the male die without rupturing it or blowing off the bottom thereof only by using a usual releasing method such as a simple method comprising ejecting air from within a male die. These rupture of the product or blowing off the bottom thereof have been very disadvantageous from the viewpoint of industrial production.

This invention eliminates such disadvantages as mentioned above and makes it possible to make foam plastic containers using much less heating and cooling energy, this being greatly conducive to the industry concerned.

FIG. 1 is a fragmentary plan view of an expansible foamed plastic sheet illustrating how the side wall blanks (FIG. 1 (A) shows the blanks for frusto-conical type side wall and FIG. 1 (B) the blanks for cylindrical type side wall) of cups may be cut;

FIG. 2 is a diagrammatic view illustrating the positioning of the side blank and bottom blank in the space between male and female dies;

FIG. 3 is a diagrammatic view illustrating the thermal expansion of the side blank, especially in the upper and lower broader space sections of the space between the dies;

FIG. 4 is a diagrammatic elevational view illustrating how the expanded upper and lower end portions of the heated wall blank are compressed by upper and lower rim compressors, respectively;

FIG. 5 shows the use of leak preventers in compressing the upper and lower rim portions of the expanded wall blank;

FIG. 6 is a diagrammatic plan view of the dies in the space between which the side wall blank is in position, said dies being provided with a narrow passage for flowing a heating or cooling medium;

FIG. 7 is a diagrammatic view illustrating how the cups are stacked in nesting relation by means of a projection provided at the lower, inner side of the cups;

Figure 8:
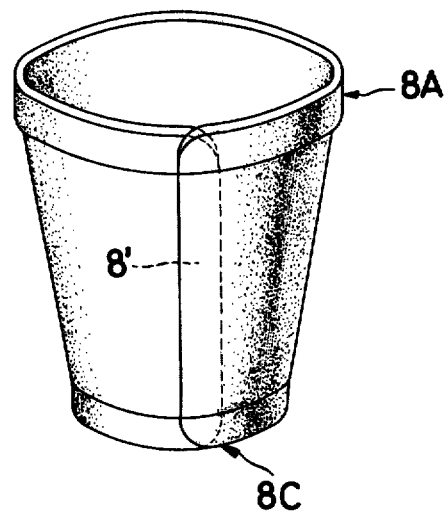
FIG. 8 is a view illustrating an as-espanded cup blank wherein the overlapped portions of the wall blank are shrunk.
Figure 9:
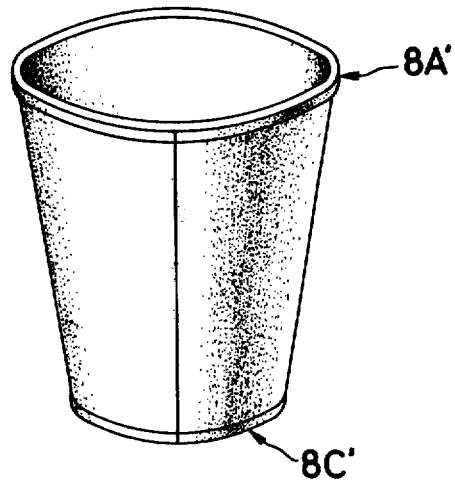
FIG. 9 is a view illustrating a completed cup wherein the upper and lower end portions of the wall blank of FIG. 8 are compressed to form upper and lower rigid rims.

Referring now to the drawings, the preferred embodiment of this invention will be detailed hereunder.

FIG. 1 (A) illustrates how the side wall blanks 8 of frusto-conical type cups may be cut and FIG. 1 (B) how the side wall blanks 8 of cylindrical type cups may be cut. The side wall blank 8 with its end portions overlapped each other is inserted in a female 2 as shown in FIG. 2 and then a bottom blank 17 is placed on the bottom of the female die and within the wall blank 8. The bottom blank 17 may be circular in shape and may be cut out of a foamed or non-foamed plastic sheet, paper or the like. A mating male die 1 is then inserted in the female die 2 so that there is established therebetween a predetermined space wherein the wall and bottom blanks 8, 17 are present as indicated in FIG. 2. In the male die 1, a heated fluid such as steam or heated oil is forcibly introduced through a male inlet pipe 6 for a heating or cooling fluid (the male inlet pipe 6 being hereinafter called "male fluid inlet pipe 6"), thereafter passed through a male outer annular passage 5, a male inner annular passage 4, a male fluid passage 15 and a top annular passage 9, and then discharged through a male discharge pipe 7; while in the female die, the same heated fluid as above is compressively introduced through a female fluid inlet pipe 13, thereafter passed through a female inner annular passage 11 (FIG. 3), a female outer annular passage 10 and a female fluid passage 16 and then discharged through a female discharge pipe 14. By passing the heated fluid through said passages, the wall and bottom blanks are rapidly heated locally, that is, only at the overlapped portions 8' and the upper and lower peripheral portions to be formed to 8A, 8C of the wall blank 8. More particularly, in the wall blank 8, only the limited portions surrounded by the annular passages 4, 5, 9, 10, 11 of the dies and those surrounded by the male and female fluid passages 16, 15 are rapidly heated before heating the other portions than said ones, whereby only said rapidly heated portions are further foamed to effect the melt bonding necessary for forming a cup blank as shown in FIG. 8. The cup blank so formed has unsatisfactorily melt bonded overlapped portions 8' and imperfect upper and lower rims 8A, 8C due to the shrinkage of the expanded or secondarily foamed wall blank especially in the circumferential direction as shown in FIG. 8, said shrinkage being inevitably accompanied with the secondary foaming of the wall blank 8 when heated. For instance, when the wall blank 8 is heated, the upper portion thereof is foamed and expanded in the broader space section of the space between the dies to form an expanded upper rim portion 8A from which an upper rigid rim 8A' is to be made, as shown in FIGS. 2 and 8. According to this invention, the expanded upper rim portion 8A, which is an unsatisfactory and imperfect upper rim, is then compression molded into the rigid rim 8A' by the use of an upper rim compressor 3 in the following manner.

A foamed plastic material needs any one of two conditions to make the inner portion of the plastic material perfectly plastic since the material is of heat insulation. One of these conditions is to heat such material to a temperature which is relatively low but is not lower than the plasticizing temperature from the material, for a relatively long time to make plastic every part, including the inner part, of the material at a uniform temperature; and the other is to heat such material to a temperature which is relatively high and considerably higher than the plasticizing temperature for the material, for a relatively short time to make plastic the inner part of the material at the expense of exposing or overheating the surface thereof to such high temperature.

The object of this invention is to provide a process for the mass production of disposable cups and thus the latter condition under which the starting material is heated to a relatively high temperature for a short time, is needed for the practice of said process from the viewpoint of time economy.

In the manufacture of a cup from wall and bottom blanks, if the wall blank 8 used is made of foamed polystyrene, polyethylene or polyvinyl chloride sheet material, the expanded rim portions 8A, 8C will be required to be compressed at a temperature of at least 110°c to form rigid upper and lower rims 8A°and 8C' and, to this end, the expanded rim portions 8A, 8C will be required to be somewhat overheated at their surfaces respectively faced to the female and male dies. In this manner even the inner part of the expanded rim portions 8A, 8C is thoroughly softened thereby facilitating their compression by the rim compressors 3, 12, while the surfaces of the heated wall blank are too much softened and almost in the fluid state thereby allowing the almost fluidized surface portions to the fine clearances between the vertically movable rim compressors and the corresponding die bodies and consequentially forming so-called "flash" or "fin".

According to this invention, this problem of fin has been solved by the following procedures. One of the procedures is to rapidly cool the almost fluidized surface portions of the expanded wall blank by forcing cooling water, cooled oil or the like through the fluid inlet pipes 13, 6 a while before the start of compression of the expanded rim portions 8A, 8C, to thereby form somewhat solidified surface portions or crusts while keeping still plastic the inner part of the expanded wall blank due to the fact that it is a foamed plastic material having high insulation. When such expanded wall blank is compressed at its upper and lower rim portions 8A, 8C and then cooled, there will be obtained a fin-free, attractive cup having rigid upper and lower rims 8A', 8B'. The other of the procedures to solve the problem of fin is to provide leak preventers 3', 12' ahead of the tips of the rim compressors 3, 12, respectively, as shown in FIG. 5. The leak preventers 3', 12' may be made of Teflon, nylon, a heat-resistant synthetic rubber, a flexible metal or the like and are V- or U-shaped so that their edges are pressed against the die walls facing thereto when pushed forward by the upper and lower compressors, respectively, whereby the almost fluidized surface portions of the expanded wall blank are prevented from entering the clearance which may otherwise be present between the rim compressor and the die body. This will result in the production of fin-free, attractive cups having upper and lower rigid rims as well as a bottom securely joined with the side wall.

The tip or top portion of the male die 1 is so shaped that the wall is provided with a projection 8B when a wall blank for the wall is heated to foam and then cooled in the dies as shown particularly in FIGS. 2 and 7, the projection 8B being useful for mounting thereon another similar cup. Thus, such cups may be piled up one upon another in nesting relation by means of such projections. Further, the projection is useful for preventing the bottom 17 of the cup from coming off the wall. The bottom is thus securely joined with the wall with aid of the projection 8B and the lower rigid rim 8C' as indicated particularly in FIG. 7. Therefore, in addition to such an expansible plastic material as is usable for the wall blank, nonplastic materials such as cardboard, paper, tin plate or the like may be used as the bottom blank to obtain a leak-proof cup desired.

As previously mentioned, according to this invention, the overlapped end portions 8' of a wall blank 8 are together melt bonded in the dies which are designed to locally heat and cool only the overlapped end portions 8' and the upper and lower portions of the wall blank 8 to obtain the end portions 8' in the melt bonded state, expanded upper and lower rim portions 8A, 8C and projection 8B. The use of the locally limited heating of the overlapped end portions of a wall blank in the dies permits the use of the wall blank having a very large thickness with respect to the space or clearance between the dies in position. For example, when the dies are positioned so that a predetermined space or clearance of 1 mm is established therebetween, a wall blank having a thickness of about 0.6 to about 1.2 mm may be used since the wall blank including the overlapped end portions 8' can be compressed in the thickness direction without jamming the blank downward by inserting the male die in the female die, wherein the blank is previously placed in position, to establish said predetermined clearance therebetween in the manufacture of an ordinary or frusto-conical type cup. On the other hand, in the manufacture of a cylindrical cup, a wall blank should have a thickness of about 0.4 to about 0.7 mm to prevent from being jammed downward by the insertion of the male die in the female die. When subjecting the wall blank having thickness as mentioned above to local heating and cooling in the dies, the overlapped end portions 8' are together melt bonded perfectly and a satisfactory wall is formed without difficulties in forming due to shrinkage which will be caused if the blank is wholly heated as in the conventional processes, and without chaps and roughness created on the surface and a print being peeled off the surface if the print is borne thereon and discoloring the wall. The satisfactory wall thus formed in the dies can be easily released therefrom because of its extremely small shrinkage created during the molding or forming operation.

As is apparent from the foregoing, the process of this invention is characterized by locally and limitedly heating and cooling in the dies only the specific wall and bottom blank portions such as the overlapped end portions of the wall blank and the upper and lower end portions thereof, to form from said blanks an attractive, high grasp-strength, disposable cup without peeling a print from the wall blank if the print was made thereon, roughening the surfaces of the blanks and substantial shrinkage especially even in the circumferential direction. Furthermore, the thickness of wall and bottom blanks which may be used, may be varied more widely and the step of releasing a cup formed in the dies from the male die is simplified in the practice of this invention.

In one embodiment of this invention, there may be used a wall blank whose overlapped end portions 8' are preliminarily bonded together by the use of a binder, a wall blank made by extruding into a tubular form, or wall and bottom blanks wherein the portions to be melt bonded are preliminarily coated with a heat-sensitive binder for ensuring securer bonding. According to this invention, there can also be produced containers having other various shapes, such as box-type or cubic containers.

What is claimed is:

1. In a process for producing containers made of foamed plastics comprising the steps of:

cutting a side wall blank from an expansible foamed plastic sheet material to form the container wall, curling the wall blank so that its longitudinal end portions overlap, providing a separate bottom blank for the container, the bottom blank being cut out of a plastic or nonplastic sheet material, and joining the wall and bottom blanks together to form them into the container with a joined overlapped wall seam, the process characterized by (1) positioning the wall and bottom blanks in a predetermined space having a broader space section at each end thereof, the space being formed between female and male dies in position which are designed, when set in position, to form said space, (2) applying localized heating to top and bottom longitudinal end portions of the rolled blank to melt and expand said localized end portions whereby said localized heated end portions expand relative to the remaining portions of the rolled blank, said localized heating effecting melt bonding of said overlapped longitudinal end portions, (3) subsequently applying localized cooling to said localized heated end portion to form solidified outer crusts on said latter portions while the remaining inner sections remain in a moldable state, and (4) applying a longitudinally directed compressive force to said end portions to longitudinally foreshorten and thereby mold said latter portions into desired configurations to form fin-free, rigid rims on the top and bottom of the cup and to effect securement of the bottom blank to said rolled blank.

2. In a process as set forth in claim 1 wherein said localized heating is effected by passing a heating medium through passages in said dies located adjacent to said top and bottom longitudinal end portions.

3. In a process as set forth in claim 2 wherein said localized cooling is effected by passing a cooling medium through said passages, said localized cooling being effected subsequent to the application of said localized heating and prior to the application of said compressive force.

4. In a process as set forth in claim 1 wherein said application of localized cooling sufficiently solidifies the outer surface of said localized heated end portions to preclude formation of flash during subsequent application of said compressive force.

5. In a process as set forth in claim 2 wherein said application of said compressive force is effected by a longitudinally movable sleeve movable in said dies, and effecting a seal between said movable sleeve and said dies to preclude passage of plastic material between said movable sleeve and said dies to thereby provide fin-free rigid rims.

* * * * *